US006684397B1

United States Patent
Byer et al.

(10) Patent No.: US 6,684,397 B1
(45) Date of Patent: Jan. 27, 2004

(54) AUTO-INSTALL APPARATUS AND METHOD

(75) Inventors: James Earle Byer, Duvall, WA (US); Marlon Borup, Orem, UT (US)

(73) Assignee: Novell, Inc., Provo, UT (US)

(*) Notice: Subject to any disclaimer, the term of this patent is extended or adjusted under 35 U.S.C. 154(b) by 271 days.

(21) Appl. No.: 09/871,196

(22) Filed: May 31, 2001

Related U.S. Application Data

(63) Continuation of application No. 08/925,261, filed on Sep. 8, 1997, now abandoned.

(51) Int. Cl.[7] .................................................. G06F 9/445
(52) U.S. Cl. ........................................................ 717/174
(58) Field of Search ................................. 717/168–178; 709/200–253

(56) References Cited

U.S. PATENT DOCUMENTS

| | | |
|---|---|---|
| 4,974,149 A | 11/1990 | Valenti |
| 5,361,360 A | 11/1994 | Ishigami et al. |
| 5,367,686 A | 11/1994 | Fisher et al. |
| 5,421,009 A | 5/1995 | Platt |
| 5,442,791 A | 8/1995 | Wrabetz et al. |
| 5,446,910 A | 8/1995 | Kennedy et al. |
| 5,555,416 A | 9/1996 | Owens et al. |
| 5,684,952 A * | 11/1997 | Stein ........................... 709/221 |
| 5,717,930 A | 2/1998 | Imai et al. |
| 5,742,829 A | 4/1998 | Davis et al. |
| 5,809,251 A | 9/1998 | May et al. |
| 5,860,012 A | 1/1999 | Luu |
| 5,909,545 A | 6/1999 | Frese, II et al. |
| 6,110,228 A | 8/2000 | Albright et al. |
| 6,144,992 A * | 11/2000 | Turpin et al. ................. 709/208 |
| 6,189,051 B1 * | 2/2001 | Oh et al. ...................... 717/175 |
| 6,282,712 B1 * | 8/2001 | Davis et al. .................. 717/170 |

OTHER PUBLICATIONS

*SunOS Manpage for NETCONFIG (8c)*, Software Patent Institute Database of Software Technologies, Record 84, Ser. No. sunos.1252 (Published Feb. 1988).
*SunOS Manpage for Systems(5)*, Software Patent Institute Database of Software Technologies, Record 83, Ser. No. sunos. 0995 (Published Sep. 1989).
*Remote Software Installation Protocol*, IBM Technical Disclosure Bulletin, vol. 34, No. 10A (Mar. 1992).

(List continued on next page.)

*Primary Examiner*—Wei Zhen
(74) *Attorney, Agent, or Firm*—Haynes and Boone, LLP

(57) ABSTRACT

An apparatus for remote installation of software is disclosed in one presently preferred embodiment of the present invention as including a first processor programmed to execute a master process effective to communicate with and control a slave process; a storage device operably connected to the first processor to store first configuration data; a second processor operably connected to the first processor for executing the slave process effective to communicate with and be controlled by the master process, and programmed thereby to execute an installation program; and a memory device operably connected to the first processor to store inputs to and outputs from the slave process. The memory device may include a first memory device operably connected to the first processor and a second memory device operably connected to the second processor. Communications between the master process and the slave process may be achieved through a communication link operably interposed between the first processor and the second processor. The communication link comprises a first communication module operably associated with the master process, a second communication module operably associated with the slave process, and an electronic connection between the first communication module and the second communication module. A second storage device may be operably connected to the second processor to store the installation program and modules installable thereby.

23 Claims, 5 Drawing Sheets

OTHER PUBLICATIONS

*Using Actions to Run Remote Applications*, Software Patent Institute Database of Software Technologies, Record 42, Ser. No. hp30085.0120 (Published Sep. 1992).

*Install Agent Software Automatically*, Software Patent Institute Database of Software Technologies, Record 3, Ser. No. hp30070.0017 (Published Jul. 1993).

*Installing the SD Agent on Remote Systems*, Software Patent Institute Database of Software Technologies, Record 135, Ser. No. hp60074.0077 (Published Jul. 1993).

*Automated System for the VSE/ESA Operating System*, IBM Technical Disclosure Bulletin, vol. 37, No. 12 (Dec. 1994).

* cited by examiner

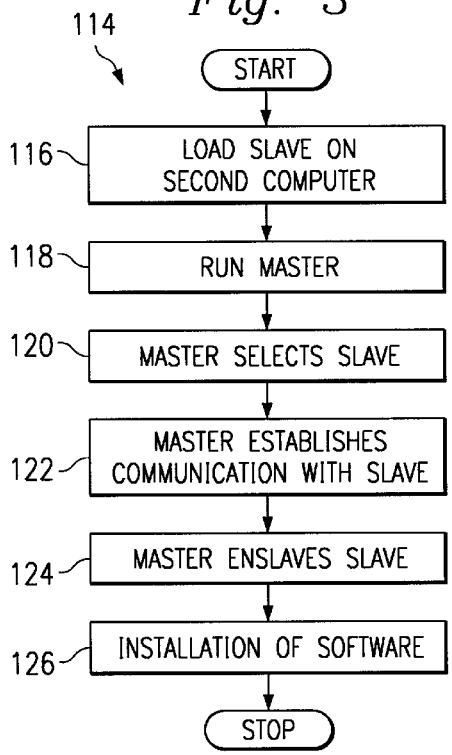
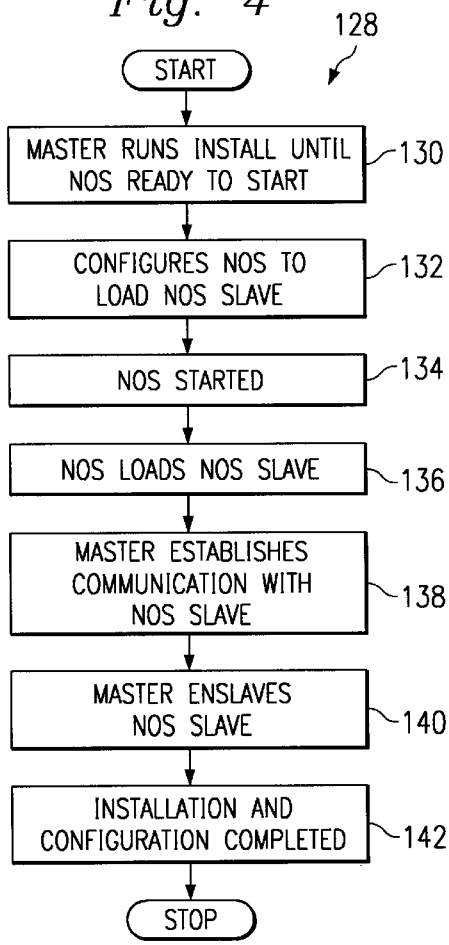
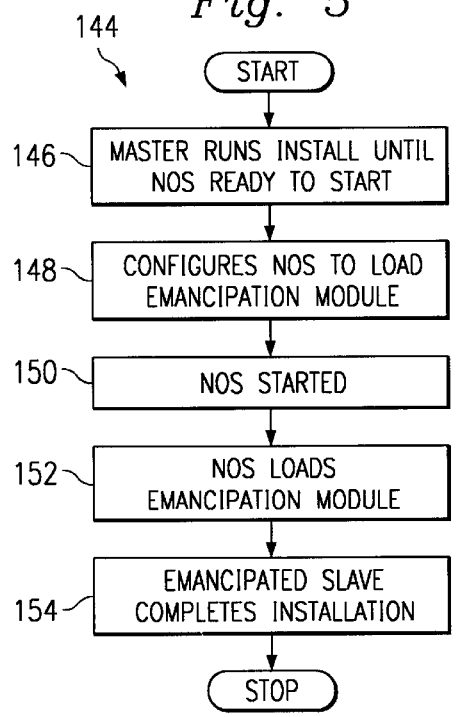

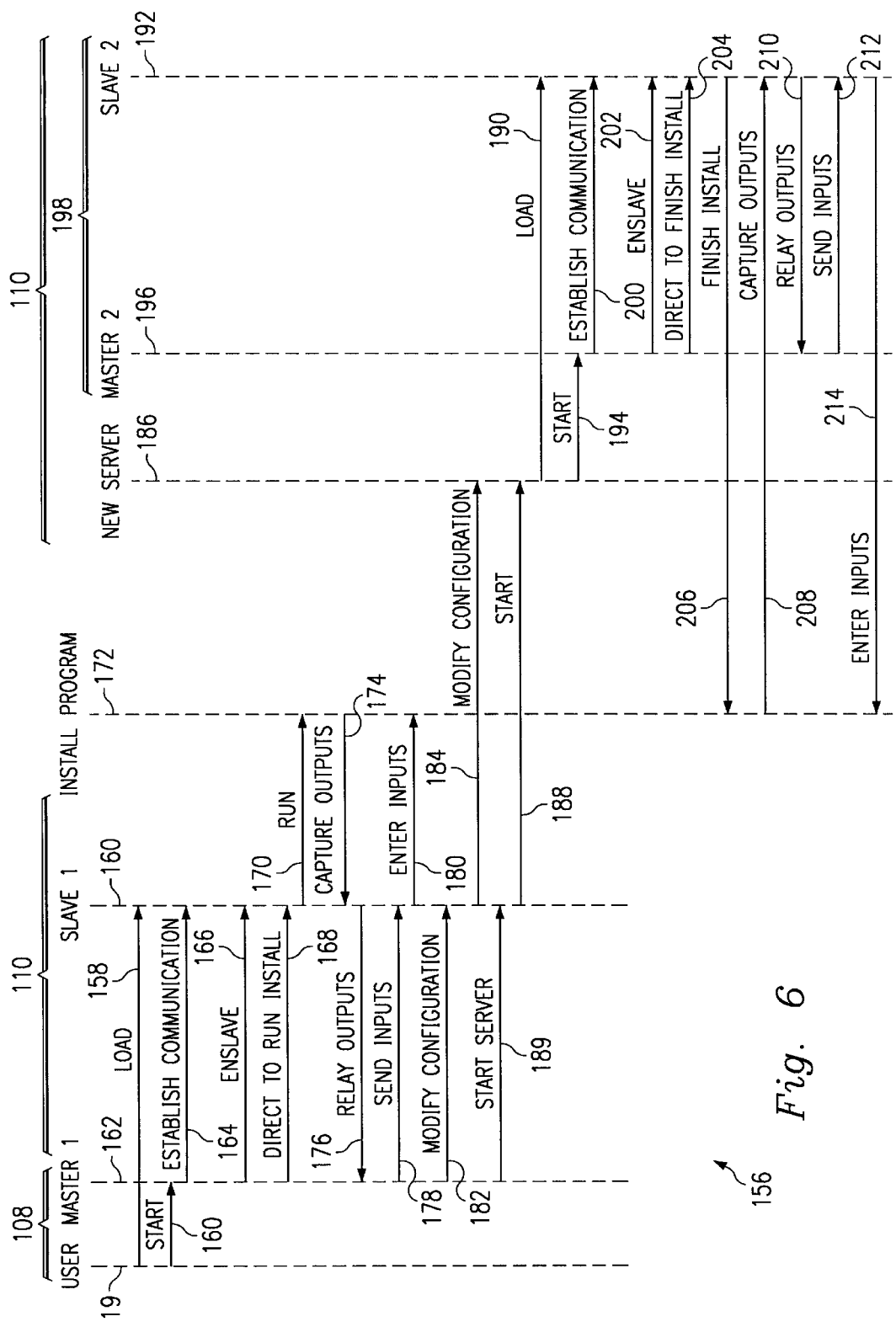

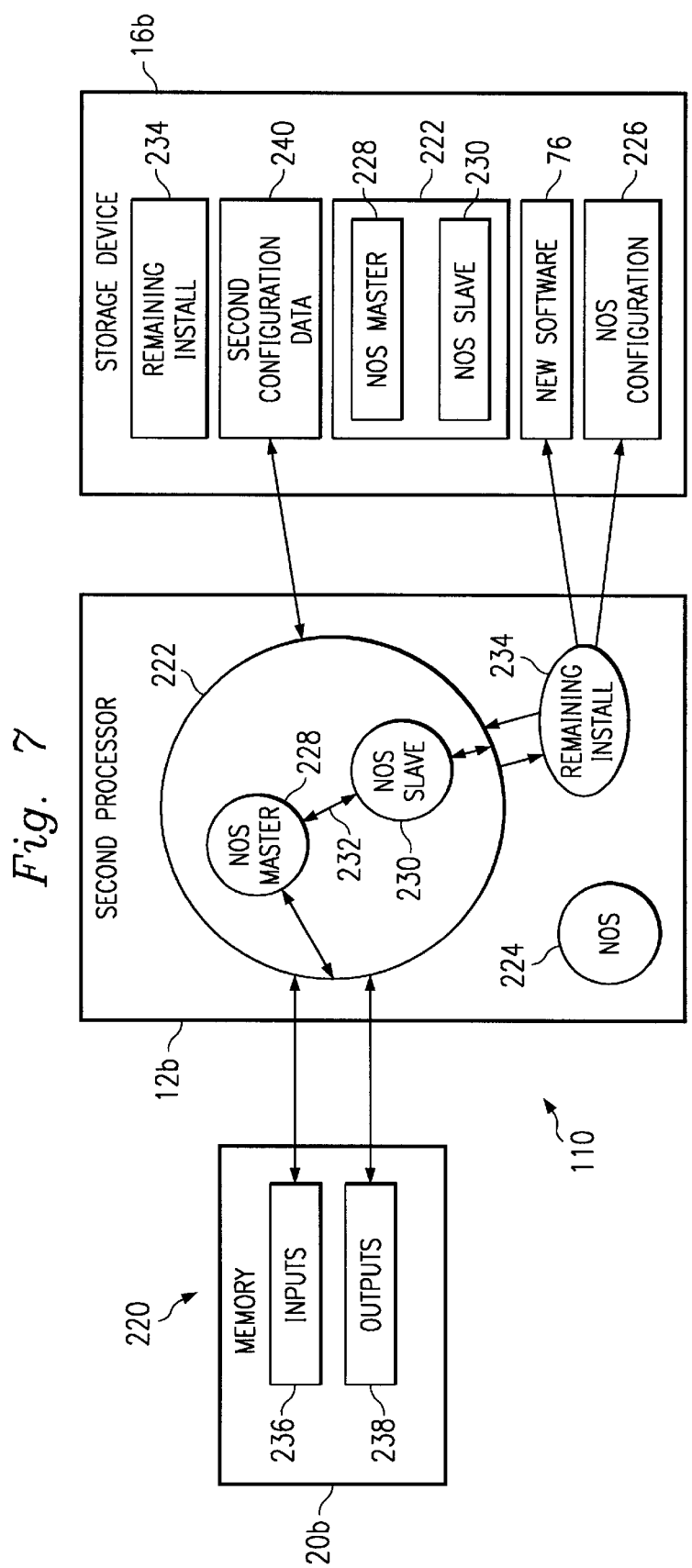

AUTO-INSTALL APPARATUS AND METHOD

This application is a Continuation of U.S. Ser. No. 08/925,261, filed Sep. 8, 1997 now abandoned.

BACKGROUND

1. The Field of the Invention

This invention relates to computers and software generally and, more particularly, to novel systems and methods for remotely initiating and managing the installation process for software on computers in a network.

2. The Background Art

In today's work environment the computer plays an essential role. Most people in the work place have a computer on their desk and work with it everyday. Computer networks are often utilized to connect the many computers used in each work environment. Networks enable computers to communicate with each other permitting coworkers to send email to one another, to print on a network printer, to run programs that require network resources, etc.

Many different technologies are used with computer networks, from different types of computers to different operating systems. Programs, or applications, like word processors or spreadsheets, facilitate much of the work done by people today. An operating system is a piece of software that runs on a computer and enables a program to run on that computer. In other words, typically programs know how to talk to the operating system, and the operating system knows how to talk to the computer and tell it what to do. In this way, the operating system acts as a translator between the applications and the computer hardware.

Operating systems and programs are often installed on a computer before they are executed, or run, by that computer. In a typical installation, a computer user actively steps through the installation process as it takes place, which usually requires the user to insert disks and/or CD-ROMs at specified times and answer certain questions so that the installation program knows how the user wishes to configure the new program and/or the operating system.

Typically, system administrators run networks and take care of the software on the computers in the network. Depending on the size of the network and the number of software items installed, installing new software can take a lot of time. For example, if a network included 50 computers and all the computers on the network were to be upgraded to a new operating system, the system administrator may sit down in front of each of the 50 computers and go through the installation process. If each installation took 1 hour, it may take the system administrator 50 hours or more to upgrade the network's computers to this new operating system.

To somewhat reduce the burden on the installer, the files to be installed may first be installed onto the network server. The installer may then install the new software on each client computer, but instead of having to swap disks and/or CD-ROMs into and out of the client computer, the installer may copy necessary data from the server to the client machine. Although this method saves some time of the system administrator, the administrator still typically walks through the installation process manually at that computer.

Another method developed to help in installing software remotely combines all files that are being remotely installed into a single data stream, sends this single data stream over the network to the remote computer system, and separates the data stream into the original files on the remote system. However, this method is apparently directed toward installations involving the basic storing of files. Many installations require substantial user input throughout the installation process to complete the installation and configuration of the new software.

Not only is there a need for a better, less time consuming way to install software on a network, but there is a great need for such an improvement in the software testing environment. This may be especially true where the software being tested is integrally related to a computer network in that communication over a network with other components is necessary to fully test the new software.

Testing new network operating systems, or servers, may become easier if there were an improvement in installing such software. In many corporate environments, several networks are joined together facilitating communication between the separate networks. Often these networks, specifically the servers, are organized into a tree structure. Each server in such a tree may be referred to as a node. At the top of this tree structure lies a root node or root. The interconnected servers below the root node spread out in a branching type of pattern forming a tree, or a web-like structure.

The tree is a logical structure. There is also a physical layout of servers: partitions. In the logical tree there are objects that represent the servers. As stated, the tree has a root. The root partition could reside on any physical server. Portions of the logical tree are stored in various partitions. This allows changes to be made for optimizing performance. Partitions may be read-only, or they may be read-write. In addition, there is a master partition. The logical tree, partitions, the type of partitions, and the like, all need to be decided before or during the installation of the network operating system and/or before or during the installation and configuration of the logical tree structure. This considerable amount of configuration may make testing the network software and the tree structure a very lengthy process because of the time and effort it takes to set up the network and tree structure.

Organizational logical trees formed like this are useful for companies for several reasons. A company that is spread out across a large area would benefit greatly from the concept of logical trees and the proper layout of physical partitions. One location may only need to know the organization of another area and may only need a local copy of the partition, or partitions, from other areas. This can greatly increase the performance of the network. A large company with many locations may organize physical partitions in a way that optimizes use of their logical tree.

Network operating systems and logical tree structures serve important roles in the computer systems used in the workplace. In order to adequately test the server and networking software that is used in such systems, networking software companies need to set up many servers and logical trees themselves. To adequately test the server software, trees of several hundred servers may be required. In some testing environments these trees of servers need to be set up and tested quickly so that a new tree of servers may be constructed to run another set of tests. The time required for a tester to install all of these servers and configure them in a tree could take a considerable amount of time. Because of the complexities of a new server being installed, a person generally must attend to a server installation. This consumes a considerable amount of resources and also slows down the testing of networking software and of logical trees associated with the networking software.

BRIEF SUMMARY AND OBJECTS OF THE INVENTION

In view of the foregoing, it is a primary object of the present invention to provide apparatus and methods for remotely initiating and managing the installation process for software on computers in a network.

It is also an object of the invention to provide for remotely installing software requiring an interactive installation process.

Further, it is also an object of the invention to provide apparatus and methods for remotely installing a new operating system.

It is still a further object of the invention to enable the remote installation and configuration of a network operating system.

In addition, it is an object of the invention to provide apparatus and methods whereby a remote computer executing the newly installed network operating system is capable of completing the installation and configuration of the new network operating system.

Consistent with the foregoing objects, and in accordance with the invention as embodied and broadly described herein, a method and apparatus for remote installation of software are disclosed in one embodiment of the present invention as including a first processor programmed to execute a master process effective to communicate with and control a slave process; a storage device operably connected to the first processor to store first configuration data; a second processor operably connected to the first processor for executing the slave process effective to communicate with and be controlled by the master process, and programmed thereby to execute an installation program; and a memory device operably connected to the first processor to store inputs to and outputs from the slave process.

The memory device may include a first memory device operably connected to the first processor and a second memory device operably connected to the second processor. Additionally, a second storage device may be operably connected to the second processor to store the installation program and modules installable thereby.

To make the master process aware of its accessibility, the slave process comprises an advertising module for advertising availability of the slave process. The advertising may be accomplished according to the Standard Advertising Protocol. Accordingly, the data structures contained in the first memory device and/or on the storage device may include a slave list reflecting addresses of available slave processes. The data structures may further comprise the configuration data for configuration of the master process.

The slave process may include an input module for entering input received from the master process to the installation program. An output module may also be included within the slave process for receiving output from the installation program and sending the output to the master process.

Communications between the master process and the slave process may be achieved through a communication link operably interposed between the first processor and the second processor. The communication link comprises a first communication module operably associated with the master process, a second communication module operably associated with the slave process, and an electronic connection between the first communication module and the second communication module.

The memory and/or storage utilized with the present invention contains data structures used in remotely installing software. The data structures may include the master process, the first communication module, an operating system executable to communicate instructions from the master process module to the processor, the slave process, the second communication module, and the install program to effect installation of the software.

The first memory device may store the master process module and the first communication module, and the second memory device may store the slave process module and the second communication module. The communication modules may be client communication modules for communicating with a network server module executable to communicate over a network.

A method for remotely installing software in accordance with an embodiment of the invention may include installing an operating system on a first computer comprising the first processor; installing an operating system on a second computer comprising the second processor; loading the slave process on the second processor; executing the master process on the first processor; establishing the communication link between the master process and the slave process; enslaving, by the master process, the slave process to program the second processor; and initiating, by the second processor, the installation of new software on the second computer by relaying inputs to the installation program through the slave process from the master process and relaying outputs to the master process through the slave process from the installation program. Before installing the operating system on the second computer, the hard drive (or the second storage device) of the second computer may be partitioned to facilitate the installation of a network server.

The slave process may be emancipated by providing an emancipation module in the second computer. Emancipating the slave process may include interrupting the installation to cease communication of instructions from the master process, and completing, by the emancipation module, the installation of the new software on the second computer.

The new software to be installed may comprise a network server comprising a set of instructions. In installing a network server the method for remotely installing the server may include installing a subset of the instruction set and interrupting the installation of the network server when the subset is fully executable by the second processor.

Before the new server is started, the slave process may be directed to modify server configuration files to load the emancipation module containing a network master process and a network slave process. The network master process and the network slave process may be linked to form an emancipated slave. Subsequently, when the network operating system is loaded on the second computer, the network operating system, in accordance with the server configuration files, loads the emancipation module and may further execute the network master process on the second computer.

The emancipated slave may initiate a remainder process including completing configuration and installation of the server, which may comprise installing in a network directory services tree an object corresponding to the network server. Inputs may be relayed to the remainder process by the network slave process, and outputs may be relayed to the network master process from the network slave process.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 is flow diagram illustrating process steps that may be taken in one presently preferred embodiment of the present invention for remotely installing software using a master process and a slave process;

FIG. 4 is flow diagram illustrating process steps that may be taken in one presently preferred embodiment of the present invention for remotely installing a network operating system;

FIG. 5 is flow diagram illustrating process steps that may be taken in one presently preferred embodiment of the present invention for remotely installing a network operating system using an emancipated slave;

FIG. 6 is a thread diagram of one presently preferred embodiment of the present invention for remotely installing new software onto a second computer by a first computer; and FIG. 7 illustrates the second computer used in one presently preferred embodiment of the present invention implemented with an emancipation module being used to complete the installation of the new software.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but is merely representative of the presently preferred embodiments of the invention.

Figure 1:
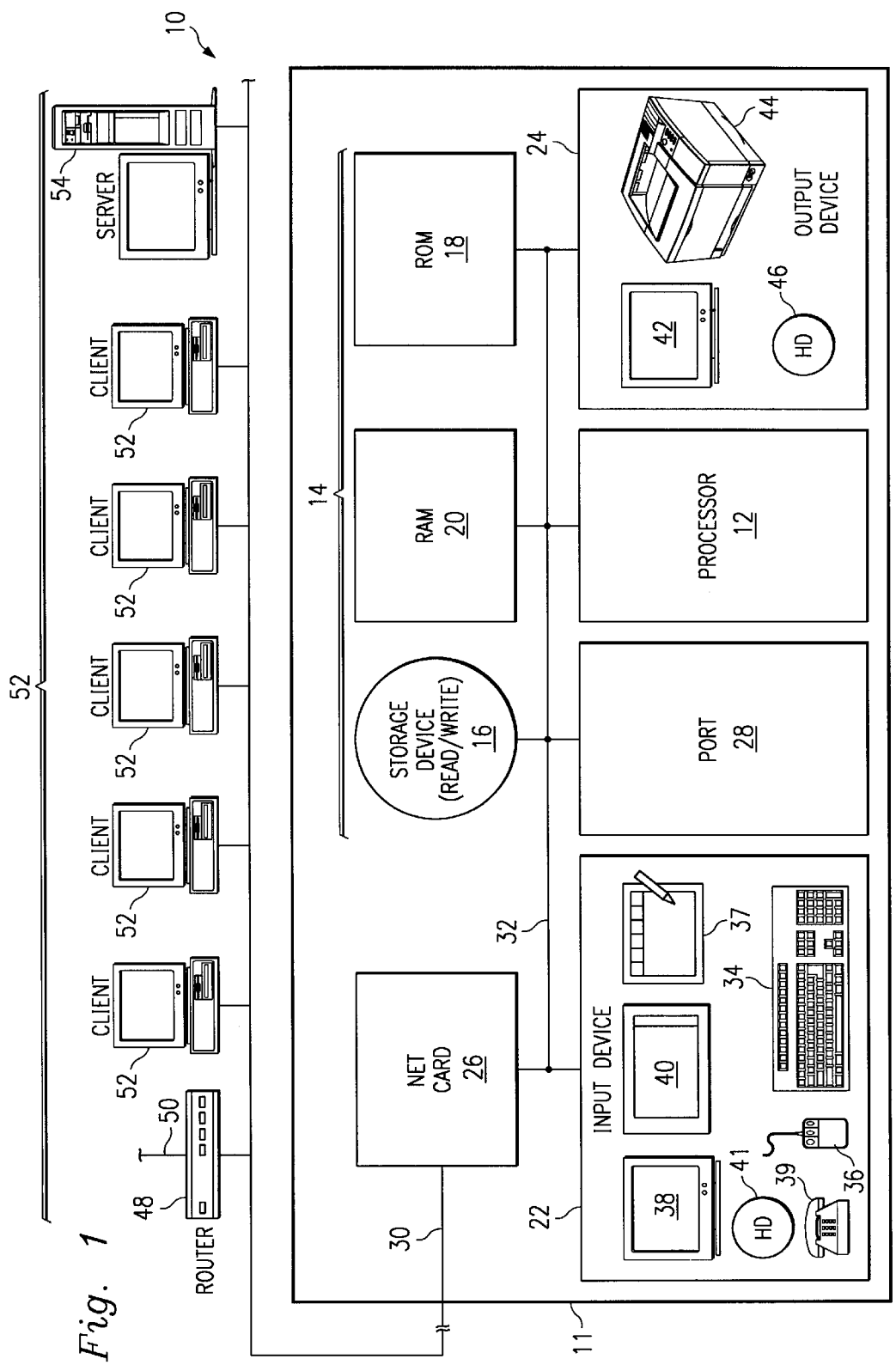
FIG. 1 is a schematic block diagram of one embodiment of an apparatus for remotely installing new software over a network, in accordance with the invention.
Figure 2:
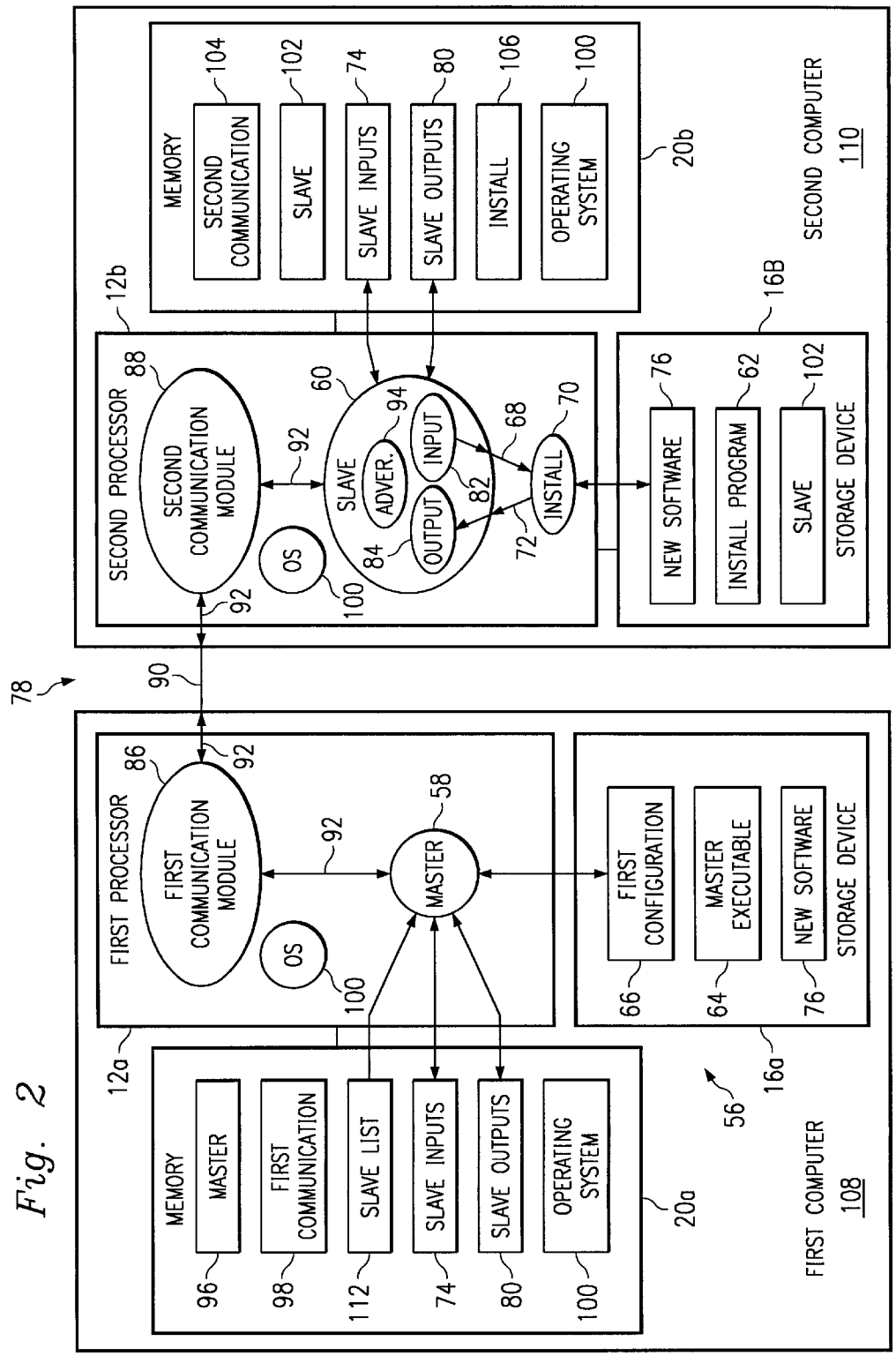
FIG. 2 is a schematic block diagram of one embodiment of the present invention including the executable code and data structures that may be used in remotely installing new software through a first computer onto a second computer.

The presently preferred embodiments of the invention will be best understood by reference to the drawings, wherein like parts are designated by like numerals throughout. FIG. 1 illustrates an apparatus that may be used in accordance with the present invention to remotely install new software. FIG. 2 illustrates the executable code and data structures that may be used and stored on various components to support remotely installing software on a second computer. FIGS. 3–5 are flow diagrams illustrating various process steps that may be taken in accordance with the present invention to remotely install software on a computer. The thread diagram of FIG. 6 may illustrate the timing and events of the flow diagrams of FIGS. 3 and 5. FIG. 7 illustrates the executable code and data structures of the second computer used in one presently preferred embodiment of the present invention implemented with an emancipation module being used to complete the installation of the new software.

Referring to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like, for other nodes 52 on a network 30. Typically, a server 54 may be accessed by all nodes 11, 52 on a network 30. Nevertheless, other special functions, including communications, applications, directory services, and the like may be implemented by an individual server 54 or multiple servers 54. A node 11 may be a server 54.

In general, a node 11 may need to communicate over a network 30 with a server 54, a router 48, or nodes 52 or server 54. Similarly, a node 11 may need to communicate over another network (50) in an internetwork connection with some remote node 52. Likewise, individual components 12–46 may need to communicate data with one another. A communication link may exist, in general, between any pair of devices.

Those of ordinary skill in the art will, of course, appreciate that various modifications to the diagrams of FIGS. 1 through 7 may easily be made without departing from the essential characteristics of the invention, as described in connection with the block diagrams of FIGS. 1, 2, and 7, and the flow diagrams of FIGS. 3 through 5, and the thread diagram of FIG. 6. Thus, the following description of FIGS. 2–7 is intended only by way of example, and simply illustrates certain presently preferred embodiments consistent with the invention as claimed herein.

FIG. 2 illustrates a block diagram 56 of one presently preferred embodiment of the present invention 10. An apparatus 10 for remote installation of software comprises a first processor 12a, a storage device 16a operably connected to the first processor 12a, a second processor 12b operably connected to the first processor 12a, and a memory device 20a operably connected to the first processor 12a.

The first processor 12a may be programmed to execute a master process 58 effective to communicate with and control a slave process 60. The second processor 12b may execute the slave process 60. The slave process 60 communicates with and is controlled by the master process 58. Under direction received from the master process 58, the slave process 60 may be directed to execute an installation program 62.

The master process 58 directs the slave 60 to execute specified commands (e.g., execute the installation program 62). The master 58 may be so programmed directly. In other words, the master executable 64 may be programmed to perform certain specified commands through the slave process 60. Additionally, the master 58 may use a first configuration data file 66 to determine which specified commands are to be executed through the slave process 60. One skilled in the art will realize that a mixed approach may also be used wherein some commands are "hardcoded" into the master process 58, while leaving others to be read in from the first configuration data file 66.

The storage device 16a operably connected to the first processor 12a may be utilized to store the first configuration data 66. The first configuration data 66 and/or the master executable 64 may contain the specified commands to be sent and performed by the slave process 60. When the slave 60 is directed to execute the installation program 62, the slave 60 may be required to provide inputs 68 to the install process 70 and monitor outputs 72 from the install process 70. Like the specified commands to be performed, inputs 74 to the slave process 60, and particularly to the install process 70, may be contained in the first configuration data 66 and/or the master executable 64 itself.

A second storage device 16b may be operably connected to the second processor 12b to store the installation program 62 and new software 76 and/or modules 76 installable thereby. This storage device 16b may be a hard drive, a floppy drive, a CD-ROM, an optical drive, a tape drive, a hard drive on the network, or the like.

In one presently preferred embodiment, the new software 76 may initially be stored on the first storage device 16a operably connected to the first processor 12a. The master 58 may direct the slave 60 to copy this new software 76 from the first storage device 16a to the second storage device 16b over a communication link 78 therebetween. Copying some or all of the files 76 from the first storage device 16a to the second 16b may be required in some cases. However, in other cases it may be feasible to start the installation program 62 and install the new software 76 without copying files over to the second storage device 16b.

The master process 58 may receive the output 72 from the install process 70 through the slave process 60. The master process 58 may select and perform certain actions depending upon the output 72 received. The memory device 20a operably connected to the first processor 12a may store the inputs 74 to and outputs 80 from the slave process 60. Alternatively, the inputs 74 and outputs 80 may be stored in the storage device 16a. In current design, memory 20a is utilized and operably connected to both the first processor 12a and the second processor 12b. Accordingly, a memory device 20b may be operably connected to the second processor 12b and may also store the inputs 74b, the outputs 80b, and other necessary data.

The install process 70 represents the execution of the install program 62 by the second processor 12b. Accordingly, inputs 68 to and outputs 72 from the install process 70 may be considered as being inputs 68 to and outputs 72 from the install program 62.

The slave process 60 may include an input module 82 for entering input 68 received from the master process 58 to the installation program process 70. The slave process 60 may further comprise an output module 84 for receiving output 72 from the installation process 70 and sending the output 72 to the master process 58. The slave inputs 74, 74b stored in memory, or stored on a storage device, may be substantially similar to the inputs 68 entered into the installation process 70. Likewise, the slave outputs 80, 80b may be substantially similar to the outputs 72 received from the install process.

A communication link 78 may be operably interposed between the first processor 12a and the second processor 12b for communications between the master process 58 and the slave process 60. This communication link 78 may be achieved in a variety of ways.

The communication link 78 may comprise a first communication module 86, a second communication module 88, and an electronic connection 90 between the first communication module 86 and the second communication module 88. The first communication module 86 is operably associated with the master process 58 and, accordingly, relays data 92 between the master process 58 and the slave process 60. The second communication module 88 is operably associated with the slave process 60 and operates similarly to the first communication module 86 in relaying data 92 between the slave process 60 and the master process 58.

The electronic connection 90 between the first communication module 86 and the second communication module 88 may be accomplished in many different ways, as will be appreciated by one skilled in the art.

In one presently preferred embodiment, the electronic connection 90 is accomplished over a network 30. The network media may be of any variety of types including light-conducting fiber, a wireless network, a wire-based network, etc. More specifically, possible media include coaxial, fiber-optic, shielded twisted-pair, unshielded twisted-pair, and wireless media.

Whether the network 30 is a local area network (LAN), a wide area network (WAN), or the like, several different types of networking technologies may be used with the present invention 10. For example, a network 30 used to accomplish the communication link 78 may use ethernet, token ring, Fiber Distributed Data Interface (FDDI), Integrated Services Digital Network (ISDN), etc. One skilled in the art will appreciate that many different networking protocols may be used in communicating over the network 30, including TCP/IP, IPX/SPX, NetBIOS and its derivatives, SNA, Appletalk, etc.

The first communication module 86 and the second communication module 88 may be client communication modules for communicating with a network server module executable to communicate over a network 30. Those skilled in the art will appreciate that there are many different options for networking software including Novell®, Microsoft®, IBM®, Banyan Systems, and the like.

In one presently preferred embodiment, the slave process 60 comprises an advertising module 94 for advertising its availability. Thus, before a master process 58 establishes communication with a slave process 60, the master process 58 may be made aware of the availability of the slave process 60 by the advertising accomplished by the advertising module 94. In current design, the advertising is accomplished according to the Standard Advertising Protocol.

To support remote installation of software, several data structures are used in one presently preferred embodiment of the present invention 10. These data structures may be stored in memory 20a operably connected to the first processor 12a. The data structures may include a master process module 96, the first communication module 98, an operating system 100, a slave process module 102, the second communication module 104, and the install module 106.

The master process module 96 corresponds to the master process 58 being executed by the first processor 12a. In other words, the master process module 96 is executable by the first processor 12a to communicate with and control the slave process 60, which slave process 60 corresponds to the slave process module 102. The slave process module 102 is executable to communicate with and be controlled by the master process 58 for installing software 76 on a remote computer. Those skilled in the art will appreciate that there is a high correlation between the module stored in memory and its corresponding process being executed by a processor. The process represents the module, or a portion thereof, being executed. The modules may include libraries of functions available to be called by other routines.

The operating system 100 is executable to communicate instructions from the master process module 96 to the processor 12. As will be appreciated, the operating system 100 provides a layer between applications running on the computer and the BIOS and/or hardware. The operating system 100 may be MS-DOS, PC-DOS, OS/2 WARP, Microsoft NT, Microsoft Windows 95, and the like. The first computer 108 and the second computer 110 will each be running an operating system 100. The operating system 100 of the first computer 108 may be different from the operating system 100 of the second computer 110.

Although the data structures have been enumerated relative to a memory device 20, the memory 20 may comprise the first memory device 20a and a second memory device 20b. The first memory device 20a may store the master process module 96 and the first communication module 98, and the second memory device 20b may store the slave process module 102 and the second communication module 104.

The first memory device 20a may further comprise a slave list 112 reflecting addresses of available slave processes 60. This slave list 112 may be built by information received from the advertising module 94 contained within the slave process 60.

The first configuration data 66, or portions thereof, may also be stored in the first memory device 20a for configuring the master process 58. One skilled in the art will realize that this data 66, or portions thereof, may also be stored in the second memory device 20b, or the storage devices 16a, 16b operably connected to the first 12a and second 12b processors.

In one presently preferred embodiment, the first configuration data 66 may include a list (not shown) of slaves 60 and/or computers 110 on which new software 76 is to be installed. The master 58 may query this first configuration data 66 and establish which slaves 60 are to have new software 76 remotely installed thereon. Then the master 58 may search through the slave list 112 and ascertain whether the slave 60 to be contacted is up and running. The master 58 may cycle through the list (not shown) of slaves 60 found in the first configuration data 66, carrying out the remote installation on each one.

In operation, a method for remotely installing software may include several steps. Operating systems 100 may be installed on the first 108 and second 110 computers enabling a variety of applications to be run thereon. The operating system 100 of the first computer 108 may be different than the operating system 100 of the second computer 110. For example, the operating system 100 of the first computer 108 may be a network operating system, while the operating system 100 of the second computer 110 may not be a network operating system (e.g., DOS).

If a network operating system is to be remotely installed, a user of the present invention 10 may wish to further configure the computer 110 that will be having the network operating system remotely installed thereon. This further configuration may include partitioning the hard drive or hard drives operably connected thereto.

FIG. 3 is flow diagram illustrating process steps that may be taken in one presently preferred embodiment of the present invention for remotely installing 114 software 76 using a master process 58 and a slave process 60. The slave 60 may be loaded 116 on to the second computer 110 and effectively the second processor 12b. The slave 60 may be provided to the second computer 110 by a local storage device 16b, over a network 30, or other suitable means for providing the necessary slave modules 102 to the second processor 12b to load 116 and execute 116 a slave process 60.

One skilled in the art will appreciate that the slave process 60 may be loaded 116 in a variety of ways. In one presently preferred embodiment, the slave process 60 may be a terminate-and-stay-resident program (TSR) running on DOS. Thus, the slave process 60 may remain stored in a computer's memory 20 even when it is not running. As a TSR, the slave process 60 may be rapidly invoked to accomplish a particular function. The slave process 60 may receive interrupts and control the DOS session.

However, loading 116 the slave process 60 may be accomplished by other means, For example, in an alternative embodiment the slave process 60 may be loaded 116 by starting an additional process in a multi-tasking environment.

Once the slave 60 is loaded 116 onto the second computer 110, the advertising module 94 within the slave process 60 may advertise its availability. As mentioned, in one presently preferred embodiment, this advertising may be accomplished according to the Standard Advertising Protocol.

The master process 58 may be executed 118 on the first processor 12a. In one presently preferred embodiment, the master process 58 may be started 118 on the first computer 108 by having a user execute 118 the master executable 64. In one presently preferred embodiment, this may be done by having a user, at the command prompt, simply type the name of the master executable 64 (e.g., "master") and hit enter. The master 58 may make calls to libraries 96 found in memory 20 or in a storage device 16.

From the list 112 of slaves, the master process 58 may select 120 a slave 60 on which software 76 is to be installed. This may be accomplished in different ways. A user may select the slave 60 manually. Alternatively, a file (not shown) may contain data indicating which slave 60 is to be selected. In addition, as mentioned, the first configuration data 66 may contain a list of the slaves to have the new software 76 remotely installed thereon.

After selecting 120 the slave 60, the master process 58 establishes 122 a communication link 78 with the slave process 60. In one presently preferred embodiment, the master 58 establishes 122 communication with the slave 60 through use of the IPX (Internetwork Packet exchange) protocol. IPX is the default communication protocol for a NetWare® client. This network protocol provides connectionless datagram services on top of such data link protocols as Ethernet, Token Ring, and Arcnet. Connectionless means that prior to data transmission, no control packets are sent to establish a connection.

In an alternative embodiment, such as an embodiment that may be found on a UNIX platform, the master 58 may establish 122 communication with the slave 60 through the use of sockets. Other means may be used to achieve communication between the slave 60 and the master 58.

Once the master 58 has established 122 communication with the slave 60, the master 58 may enslave 124 the slave 60. Once the slave 60 is under the control of the master 58, or enslaved 124, the master 58 may direct the slave 60 to carry out a variety of commands. The master 58 may direct the slave 60 to execute 126 the install program 62 located on the storage device 16b operably connected to the second computer 110. The install program 62 may also be accessible over a computer network 30. The master 58 effectively directs programs to be executed by the second processor 12b through the slave process 60. In one embodiment, the master 58 may direct the slave 60 through the entire installation process 126.

FIG. 4 is a flow diagram illustrating process steps that may be taken in one presently preferred embodiment of the present invention for remotely installing 128 a network operating system. Typically, in installing a new operating system, at a point in the installation process 130, the computer 110 needs to be transitioned to the new operating system, where the rest of the installation may be completed. In one embodiment involving the installation 128 of a network operating system, when the installation process 130 comes to this point, before the second computer 110 is transitioned to the new network operating system (NOS), the master 58 may, through the slave 60, configure 132 the NOS to load a NOS slave capable of receiving commands from the master 58.

In one presently preferred embodiment, the network operating system may be a NetWare® server of Novell®, Inc. There are several startup files associated with a NetWare® server, e.g., "autoexec.ncf" and "startup.ncf". NetWare® server startup files may be modified before the server is loaded and while DOS is still the functioning operating system. By modifying these startup files the NOS may be configured 132 to load a NOS slave capable of receiving commands from the master. These startup files are text files and may be modified by adding the commands to load the slave for the server. The master process 58 may then execute the command to start 134 the server. As the server begins 134, it may read in these startup files and, in accordance with the new commands found in the startup files, load 136 the NOS slave.

When the NOS is initially started 134, because of the aforementioned configuration changes, the NOS may load 136 a NOS slave. Typically, a Novell® NOS is started by typing "server" at the command line. The master 58 may direct the slave 60 to start the NOS by directing the slave 60 to execute the "server" command. The master 58 process may then wait for the new slave to advertise that it is available. The old slave 60 is no longer functioning once the server is loaded because the server takes control over the machine and DOS is no longer available. Once the new NOS slave is found, the master process 58 may proceed to configure the server accordingly.

The NOS slave may advertise its availability to the master process 58. The master process 58 may establish 138 communication with the NOS slave, enslave 140 the NOS slave, and complete 142 the installation of the new software including finalizing configuration items. Configuring 142 certain items on the new NOS may include installing in a network directory services tree an object corresponding to the new network server.

Once the installation has been completed, the master may direct the NOS slave to terminate itself, and the master may sever communication with the slave. Alternatively, the master may simply liberate ("un"-enslave) the NOS slave. This way the NOS slave will continue to run and be available to other master processes 58.

Now referring to FIG. 5, a flow diagram illustrates process steps that may be taken in one presently preferred embodiment of the present invention for remotely installing 144 a network operating system using an emancipated slave 198. In one presently preferred embodiment, the installation 144 of software may be achieved by emancipating the slave process 160. An emancipation module 222 may be provided to the second computer 110 thereby enabling the slave process 160 to be emancipated. The installation 144 of the new software 76 may begin by the master 162 instructing the slave 160 to initiate 146 installation. When the installation process 144 is ready to transition the second computer 110 from its initial operating system to the NOS, the master 162 may interrupt the installation process.

In one presently preferred embodiment, the new network server 186, comprising a set of instructions, is installed up to a point where the new network server 186 has a subset of the instruction set installed. The subset installed allows the NOS to start and run, execute the remaining installation and configuration of the new software 76. Thus, the subset is fully executable by the second processor 12b. It will be appreciated by one skilled in the art that the full set of instructions may be installed only leaving other configuration items left to accomplish.

Before allowing the second computer 110 to transition to the NOS, the master 162, through the slave 160, may configure 148 the NOS to load the emancipation module 222 once the NOS is started. This may be accomplished much like configuring the NOS to load a NOS slave by modifying the startup files.

The master 162 may direct the slave 160 to start 150 the network operating system. Once the NOS starts 150, communication between the master 162 and slave 160 may cease because,in one presently preferred embodiment, the slave 160 is no longer loaded.

The NOS may load 152 the emancipation module 222 as directed by its configuration files 226. The emancipation module 222 may contain a network master process 196 and a network slave process 192.

In one presently preferred embodiment, the emancipation module 222 includes a network master process 196 and a network slave process 192. The NOS may load the network slave process 192 and execute the network master process 196. The network master process 196 may establish communication with the network slave process 192, enslave the slave 192, and complete the installation and configuration of the new server. The operation of the emancipation module 222 may be similar to the master 58 slave 60 relationship as shown in FIG. 2 except that the processes may be run on one processor rather than two.

The network master process 196 and the network slave process 192 may communicate directly; that is, communication modules may be part of the processes 196, 192 thereby enabling them to communicate. However, it will be appreciated that the communication modules may be separate modules that facilitate communication between processes.

After the network slave process 192 and the network master process 196 have been linked together, the combination of the network slave process 192 and the network master process 196 may be referred to as an emancipated slave 198. The emancipated slave 198 may complete 154 the remainder of the installation and configuration, or a remainder process 234, of the new server 186. Thus, the involvement of the first computer 108 is no longer necessary in completing the installation and configuration of the new server 186. The remaining installation and configuration of the server 186 may have second inputs 236 relayed thereto by the network slave process 192 from the network master process 196. Outputs 238 from the remainder process 234 may be relayed to the network master process 196 from the network slave process 192.

The remainder process 234 may include many items that may safely be left until the network operating system is running on the second computer 110. Completing the configuration and the installation of the server 186 may include installing an object corresponding to the network server 186 in a network directory services tree.

Before the present invention 10 is utilized in remotely installing a piece of new software 76, and especially in the case of a new operating system or a server being installed, a user may partition a hard drive 16b operably connected to the second processor 12b, or a hard drive 16b associated with the second computer 110. This step of partitioning one or more hard drives 16b associated with the second computer 110 should be carried out before the present invention 10 is utilized.

The thread diagram 156 of FIG. 6 may illustrate the timing and events of the flow diagrams of FIGS. 3 and 5. Therefore, FIG. 6 is only meant as an exemplary thread diagram 156 of one presently preferred embodiment of the present invention 10.

As shown in FIG. 6, a user 19 may first load 158, or cause to be loaded 158, a slave 160 onto the second computer 110. A user 19 may then execute 160, or start 160, a master 162 on the first computer 108. As mentioned in relation to FIG. 3, the master 162 may then establish 164 communication with the slave 160, enslave 166 it 160, and direct 168 the slave 160 to run 170 an installation program 172 to install new software 76. During the installation process, the install program's 172 output 238 may be captured 174 by the slave 160 and relayed 176 to the master 162. Additionally, the master process 162 may send 178 inputs 236 to the slave process 160 to be entered 180 into the installation program 172 procedure. Inputs 236 to and outputs 238 from the install program 172 may be handled in this manner until a further action is desired.

After the new software 76 is able to execute, the master process 162 may direct 182 the slave process 160 to modify 184 the configuration of the new software 76. In one presently preferred embodiment, the new software 76 comprises a new server 186; the configuration of the new server 186 may be modified such that the new server 186 will load an emancipation module 222.

The new server 186 may be started 188 by the master 162 through the slave 160. The master 162 may direct 189 the slave 160 to start the new server 186. The slave 160 may then start 188 the new server 186. Once the new server 186 is started, in accordance with the server configuration files 226, the new server 186, or NOS 186, may load the emancipation module 222. This may include loading 190 a network slave process 192 and loading 194 or starting 194 a network master process 196.

The emancipated slave 198, once formed by the linking of the slave 192 and the master 196, may complete the installation and configuration of the server 186. This may include the master 196 first establishing 200 communication with and enslaving 202 the slave 192. The master 196 may then direct 204 the slave 192 to finish installing 206 the server 186. The slave 192 may run the same install program 172, or the slave 192 may run a separate install program (not shown) to complete 206 the installation.

During the completion 206 of the remaining installation and configuration items, the install program's 172 output 238 may be captured 208 by the slave 192 and relayed 210 to the master 196. Additionally, the master process 196 may send 212 inputs 236 to the slave process 192 to be entered 214 into the installation program 172. Inputs 236 to and outputs 238 from the install program 172 may be handled in this manner until the installation and configuration is complete.

FIG. 7 is a block diagram 220 illustrating components within the second computer 110 used in one presently preferred embodiment of the present invention 10 implemented with an emancipation module 222 being used to complete the installation of the new software 76. FIG. 7 depicts the typical makeup of elements of the second computer 110 after the network operating system 224 has been started. The network operating system 224 corresponds to the new server 186. The apparatus shown may be used with the flow diagram 144 illustrating the installation of software in FIG. 5.

The network operating system 224 may load the emancipation module 222 in accordance with the NOS configuration files 226. In one presently preferred embodiment, the emancipation module 222 may comprise a network master process 228 and a network slave process 230. A communication link 232 between the network master process 228 and the network slave process 230 may be formed to form an emancipated slave 222. The emancipated slave 222 may complete the installation and configuration of the new software 76, or the new server 76 in this embodiment, by executing the remaining installation 234 steps. This may be done by executing the original installation program or by executing a separate installation program. One skilled in the art will realize that there are a variety of ways that this completion of installation and configuration may be accomplished.

The remaining install program 234 may finish installing the new software 76 and may complete the configuration of the new server 224. The inputs 236 to and outputs 238 from the remaining install program 234 may be stored in memory 20b for use by the emancipated slave 222. Instructions, directions, and/or information for carrying out the remaining configuration steps may be contained in a second configuration data file 240. The remaining installation program 234 may write additional data to the NOS configuration files 226.

The emancipated slave 198, master 196, and slave 192 of FIG. 6 correspond to the emancipation module 222, master 228, and slave 230 of FIG. 7. For example, the master 196 may be an embodiment of the master 228. Differences in reference numerals are only for the convenience of the reader and are not meant to indicate that the elements must be different; they simply recognize that they may be different.

From the above discussion, it will be appreciated that the present invention provides apparatus and methods for remotely initiating and managing the installation process for software on computers in a network. Furthermore, apparatus and methods within the scope of the present invention are capable of remotely installing software requiring an interactive installation process.

Not only does the present invention facilitate the remote installation of computer programs, but it provides apparatus and methods for remotely installing a new operating system. A network operating system may be remotely installed and configured using one presently preferred embodiment of the present invention.

The present invention further provides for the remote connection to be severed before the entire installation process is complete. The remote computer executing the newly installed network operating system, in one presently preferred embodiment, is capable of completing the installation and configuration of the new network operating system.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A system for remote installation of software, the apparatus comprising:

a first processor provided with a first operating system and programmed to execute a master process within the first operating system effective to communicate with and control a slave process executing within a second operating system;

a storage device operably connected to the first processor to store first configuration data;

a second processor provided with the second operating system and operably connected to the first processor for executing the slave process within the second operating system and under control of the master process, and programmed thereby to execute an installation program;

a memory device operably connected to the first processor to store inputs to and outputs from the slave process; and software instructions for execution by the second processor, the instructions including instructions for advertising a readiness of the slave process prior to the master process establishing communication with the slave process.

2. The system of claim 1, wherein the memory device comprises a first memory device operably connected to the first processor and a second memory device operably connected to the second processor.

3. The system of claim 1, further comprising a communication link operably interposed between the first processor and the second processor for communications between the master process and the slave process.

4. The system of claim 3, wherein the communication link comprises:

a first communication module operably associated with the master process;

a second communication module operably associated with the slave process; and an electronic connection between the first communication module and the second communication module.

5. The system of claim 1, further comprising a second storage device operably connected to the second processor to store the installation program and modules installable thereby.

6. The system of claim 1, wherein the slave process comprises an input module for entering input received from the master process to the installation program.

7. The system of claim 1, wherein the slave process comprises an output module for receiving the output from the installation program and sending the output to the master process.

8. The system of claim 1, wherein the advertising is accomplished according to the Standard Advertising Protocol.

9. A system comprising memory for containing data structures for remotely installing software, the data structures comprising:

a master process module executable by a processor provided with a first operating system to communicate with and control a slave process module executable within a second operating system;

a first communication module for relaying commands sent from the master process module to slave process module;

the first operating system executable to communicate instructions from the master process module to the processor;

the slave process module executable within the second operating system executing on a remote computer in communication with and under the control of the master process module for installing software on the remote computer;

a second communication module for relaying the commands sent from the master process module through the first communication module and received by the second communication module to be fed to the slave process module; and an install module executable by the slave process module to effect installation of the software, and an emancipation module executable within the second operating system for ending communication with the master process and completing installation of the software on the remote computer using the slave process without further communication from the master process.

10. The system of claim 9, wherein the memory further comprises:

a first memory device storing the master process module and the first communication module; and a second memory device storing the slave process module and the second communication module.

11. The system of claim 9, wherein the data structures further comprise a slave list reflecting addresses of available slave processes.

12. The system of claim 9, wherein the data structures further comprise configuration data for configuration of a master process.

13. The system of claim 9, wherein the first communication module and the second communication module are client communication modules for communicating with a network server module executable to communicate over a network.

14. A method for remotely installing software from a first computer having a first processor and a first operating system to a second computer having a second processor and a second operating system, the method comprising:

loading a slave process on the second computer to execute within the second operating system;

executing a master process within the first operating system on the first processor;

establishing a communication link between the master process and the slave process;

enslaving, by the master process, the slave process to control the second processor;

initiating, by the second processor, the installation of new software on the second computer by relaying inputs to an installation program through the slave process from the master process and relaying outputs to the master process through the slave process from the installation program; and executing an emancipation process on the second computer, wherein the executing includes interrupting the installation to cease communication of instructions from the master process, and completing the installation of the new software on the second computer using the slave process.

15. The method of claim 14, wherein the new software includes a network server comprising a set of instructions, the method further comprising:

installing a subset of the instruction set; and interrupting the installation of the network server when the subset is fully executable by the second processor.

16. The method of claim 15, further comprising:

modifying server configuration files to load the emancipation module containing a network master process and a network slave process;

loading a network operating system on the second computer;

loading, by the network operating system, in accordance with the server configuration files the emancipation module; and executing the network master process on the second computer.

17. The method of claim 16, further comprising linking the network master process and the network slave process to form an emancipated slave.

18. The method of claim 17, further comprising initiating, by the emancipated slave, a remainder process including completing configuration and installation of the server.

19. The method of claim 18, further comprising:

relaying second inputs to the remainder process by the network slave process; and relaying second outputs to the network master process from the network slave process.

20. The method of claim 18, wherein completing the configuration and the installation of the server includes installing in a network directory services tree an object corresponding to the network server.

21. The method of claim 15, further comprising, before installing the operating system on the second computer, partitioning a hard drive of the second computer.

22. The method of claim 14, further comprising:

loading a first communication module for relating the inputs and the outputs on the first computer; and loading a second communication module for relaying the inputs and the outputs on the second computer.

23. The method of claim 22, wherein the communication link between the master process and the slave process is achieved through the first communication module and the second communication module.

* * * * *